(12) United States Patent
Lazoff

(10) Patent No.: US 7,047,002 B2
(45) Date of Patent: May 16, 2006

(54) POLL SCHEDULING FOR EMERGENCY CALLS

(75) Inventor: David Michael Lazoff, Middletown, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 221 days.

(21) Appl. No.: 10/688,473

(22) Filed: Oct. 17, 2003

(65) Prior Publication Data

US 2004/0151283 A1 Aug. 5, 2004

Related U.S. Application Data

(60) Provisional application No. 60/444,196, filed on Feb. 3, 2003.

(51) Int. Cl.
*H04Q 7/20* (2006.01)
*H04B 7/00* (2006.01)
*H04M 11/04* (2006.01)
*H04J 3/00* (2006.01)
*H04L 12/42* (2006.01)

(52) U.S. Cl. ............... 455/422.1; 455/521; 455/401.1; 370/336; 370/449

(58) Field of Classification Search ............. 455/422.1, 455/410, 404.1, 403, 456.1, 521; 370/449, 370/336; 379/45; 701/207
See application file for complete search history.

(56) References Cited

U.S. PATENT DOCUMENTS

| 4,683,531 | A | * | 7/1987 | Kelch et al. ............... 710/109 |
| 4,924,461 | A | * | 5/1990 | Amemiya et al. .......... 370/449 |
| 5,596,577 | A | * | 1/1997 | Perreault et al. ........... 370/449 |
| 5,677,909 | A | | 10/1997 | Heide |
| 5,956,338 | A | * | 9/1999 | Ghaibeh ................. 370/236.2 |
| 6,671,284 | B1 | * | 12/2003 | Yonge et al. ............... 370/462 |
| 6,847,824 | B1 | * | 1/2005 | Contractor ................ 455/456.1 |
| 6,885,936 | B1 | * | 4/2005 | Yashio et al. ............... 701/207 |
| 2002/0150145 | A1 | * | 10/2002 | Alriksson et al. ........... 375/132 |
| 2002/0163928 | A1 | * | 11/2002 | Rudnick et al. ............ 370/444 |
| 2003/0211839 | A1 | * | 11/2003 | Baum et al. ................ 455/403 |
| 2003/0235211 | A1 | * | 12/2003 | Thiru et al. ................. 370/469 |
| 2004/0151144 | A1 | * | 8/2004 | Benveniste ................. 370/336 |
| 2004/0151283 | A1 | * | 8/2004 | Lazoff ........................ 379/45 |
| 2004/0192252 | A1 | * | 9/2004 | Aerrabotu et al. ....... 455/404.1 |

FOREIGN PATENT DOCUMENTS

JP 09-331404 * 10/1996

OTHER PUBLICATIONS

U.S. Appl. No. 09/795,539, filed Oct. 31, 2002, Rudnick.
U.S. Appl. No. 10/063,756, filed Nov. 7, 2002, Rudnick.
U.S. Appl. No. 10/230,116, filed Aug. 28, 2003, Sherman.

* cited by examiner

*Primary Examiner*—William Trost
*Assistant Examiner*—Kiet Doan
(74) *Attorney, Agent, or Firm*—Chapin IP Law, LLC; David W. Rouille, Esq.

(57) ABSTRACT

An apparatus and methods for expeditious handling of emergency message frames (e.g., 911 voice-over-Internet-Protocol [VoIP] frames, etc.) sent by a station in a wireless local-area network are disclosed. The illustrative embodiment increases the probability with which an emergency message frame is accorded the highest quality-of-service by establishing polling schedules that preferentially accommodate stations that transmit emergency message frames.

15 Claims, 10 Drawing Sheets

POLL SCHEDULING FOR EMERGENCY CALLS

CROSS-REFERENCE TO RELATED APPLICATIONS

This application claims the benefit of U.S. provisional patent application Ser. No. 60/444,196, filed on 3 Feb. 2003, entitled "Handling 911 Calls in a Wireless LAN," which is incorporated by reference.

FIELD OF THE INVENTION

The present invention relates to telecommunications in general, and, more particularly, to scheduling polls in networks in which one or more stations place emergency calls.

BACKGROUND OF THE INVENTION

FIG. 1 depicts a schematic diagram of an exemplary wireless local-area network (LAN) 100 in the prior art comprising stations 101-1 through 101-N, wherein N is a positive integer, and access point 102, interconnected as shown. Each station 101-$i$, wherein $i \in \{1, 2, \ldots, N\}$, communicates wirelessly with other stations in local-area network 100 via access point 102.

Stations 101-1 through 101-N and access point 102 transmit blocks of data called frames. A frame typically comprises a data portion, referred to as a payload, and a control portion, referred to as a header. Frames transmitted from a station 101-$i$ to access point 102 are referred to as uplink frames, and frames transmitted from access point 102 to a station 101-$i$ are referred to as downlink frames.

Stations 101-1 through 101-N and access point 102 transmit frames over a shared-communications channel such that if two or more stations (or an access point and a station) transmit frames simultaneously, then one or more of the frames can become corrupted (resulting in a collision). Consequently, local-area networks typically employ protocols for ensuring that a station or access point can gain exclusive access to the shared-communications channel for an interval of time in order to transmit one or more frames.

Such protocols can be classified into two types: contention-based protocols, and contention-free protocols. In a contention-based protocol, stations 101-1 through 101-N and access point 102 compete to gain exclusive access to the shared-communications channel, just as, for example, several children might fight to grab a telephone to make a call.

In a contention-free protocol, in contrast, a coordinator (e.g., access point 102, etc.) grants access to the shared-communications channel to one station at a time. An analogy for contention-free protocols is a parent (i.e., the coordinator) granting each of several children a limited amount of time on the telephone to talk, one at a time. One technique in which a coordinator can grant access to the shared-communications channel is polling. In protocols that employ polling, stations submit a polling request (also referred to as a reservation request) to the coordinator. The coordinator, in accordance with a polling schedule, sequentially transmits a poll to each station that specifies a transmission opportunity (TXOP) duration during which the station has exclusive access to the shared-communications channel. Since stations transmit only in response to a poll from the coordinator, polling-based protocols can provide contention-free access to the shared-communications channel.

In local-area networks where access point 102 acts as the coordinator (e.g., some Institute of Electrical and Electronics Engineers (IEEE) 802.11 networks, etc.), access point 102 combines, when possible, a payload and a poll into a single downlink frame. For the purposes of this specification, such a frame is referred to as a downlink data/poll frame.

SUMMARY OF THE INVENTION

The present invention enables the expeditious handling of emergency message frames (e.g., 911 voice-over-Internet-Protocol [VoIP] frames, etc.) sent by a station that communicates via a shared-communications channel. In particular, the illustrative embodiment increases the probability with which an emergency message frame is accorded the highest quality-of-service by establishing polling schedules that preferentially accommodate stations that transmit emergency message frames.

In accordance with the illustrative embodiment, a station submits a polling request that specifies the destination (e.g., telephone number, Internet Protocol [IP] address, etc.) to which subsequently-transmitted frames will be directed. The access point (i.e., the coordinator), upon receiving a polling request, determines whether the destination is associated with an emergency call center. Based on this determination and the destinations of stations already in the polling schedule, the access point accordingly determines: (a) whether to add the station to the existing polling schedule, (b) what stations, if any, should be deleted from the existing polling schedule, (c) at which position in the polling schedule the station should be added, (d) the transmission opportunity (TXOP) duration for the added station, and (e) any adjustments to the TXOP durations of stations already in the polling schedule.

In accordance with the illustrative embodiment, the access point also examines the headers of frames it receives for forwarding downstream to stations. In particular, the access point determines whether the source of a received frame f is associated with an emergency call center. Based on this determination and the destinations of stations already in the polling schedule, the access point determines when to transmit a downlink data/poll frame comprising frame f's payload.

An important feature of the illustrative embodiment of the present invention is that it does not interfere in any way with protocols that assign priorities (also referred to as access categories) to frames (e.g., IEEE 802.11e, etc.). A station therefore can assign the highest priority to frames that are not part of an emergency message. In addition, the illustrative embodiment requires only minor changes to existing IEEE 802.11e stations and access points.

Although the illustrative embodiment of the present invention is disclosed in the context of wireless local-area networks, and in particular networks that provide quality-of-service (QoS) via access categories (e.g., IEEE 802.11e networks, etc.), it will be clear to those skilled in the art how to make and use embodiments of the present invention for other kinds of networks and protocols. In addition, for the purposes of this specification, the term "call," while normally used only in the context of telephones, will be used to encompass all manners of communication (e.g. email, text chat, video, etc.), and it will be clear to those skilled in the art how to make and use embodiments of the present invention for such alternative means of communication.

The illustrative embodiment comprises: (a) receiving a polling request via a shared communications channel, wherein the polling request specifies a destination for a subsequent transmission via the shared communications channel; and (b) determining whether to add the sender of the polling request to a polling schedule based on the destination.

DETAILED DESCRIPTION

Figure 1:
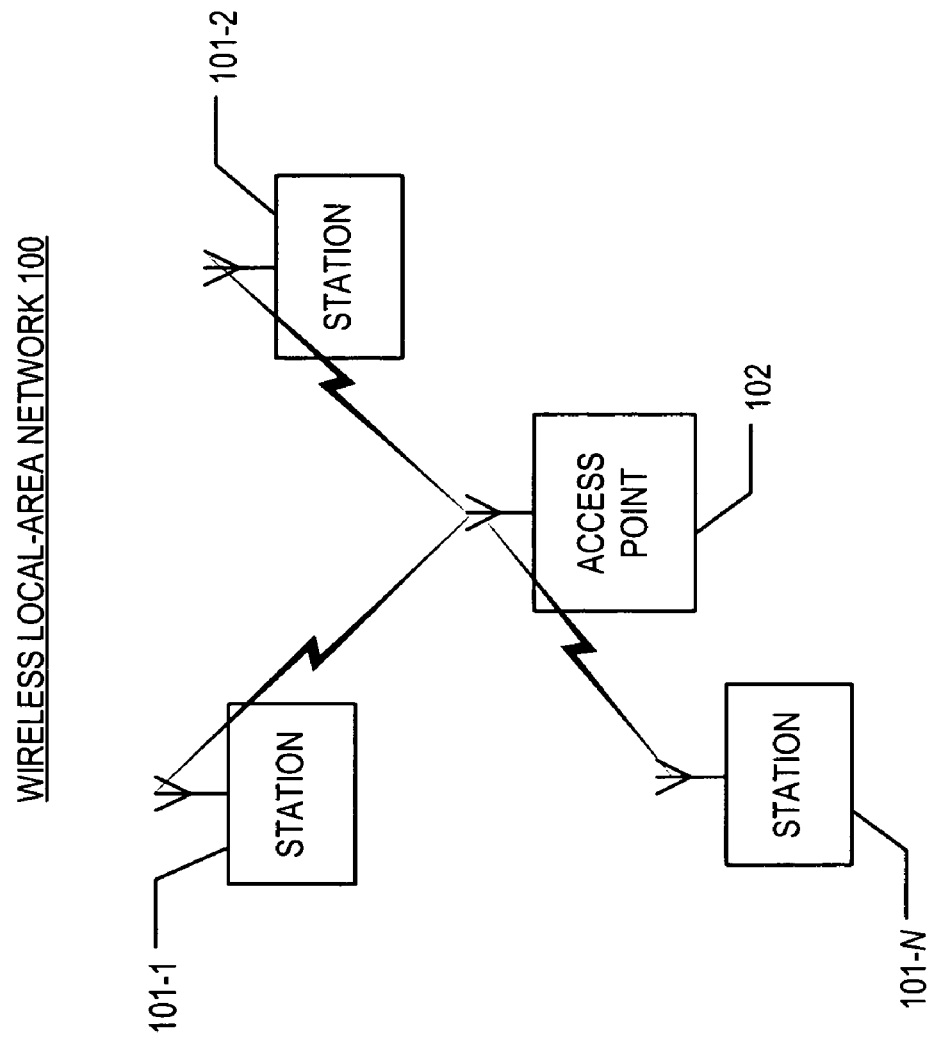
FIG. 1 depicts a schematic diagram of an exemplary wireless local-area network 100 in the prior art.
Figure 2:
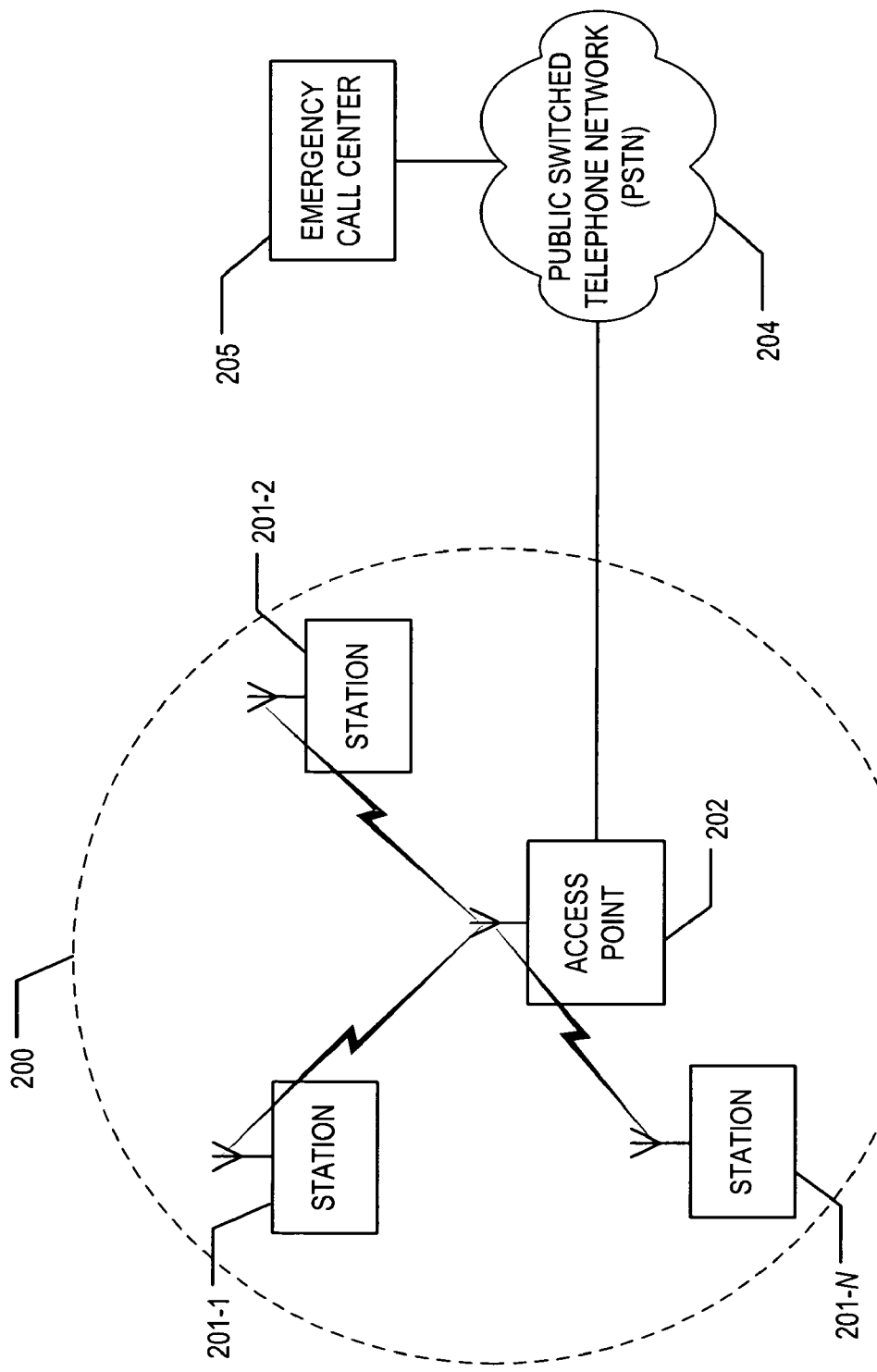
FIG. 2 depicts a schematic diagram of an exemplary wireless local-area network 200 connected to emergency call center 205 via Public Switched Telephone Network (PSTN) 204, in accordance with the illustrative embodiment of the present invention.

FIG. 2 depicts a schematic diagram of exemplary wireless local-area network 200 connected to emergency call center 205 via Public Switched Telephone Network (PSTN) 204, in accordance with the illustrative embodiment of the present invention. Wireless local-area network 200 comprises stations 201-1 through 201-N, and access point 202.

Stations 201-1 through 101-N are similar to stations 101-1 through 101-N, with the exception that each station 201-$i$, wherein $i \in \{1, 2, \ldots, N\}$, specifies in its polling requests the destination to which subsequently-transmitted frames will be directed.

Figure 6:
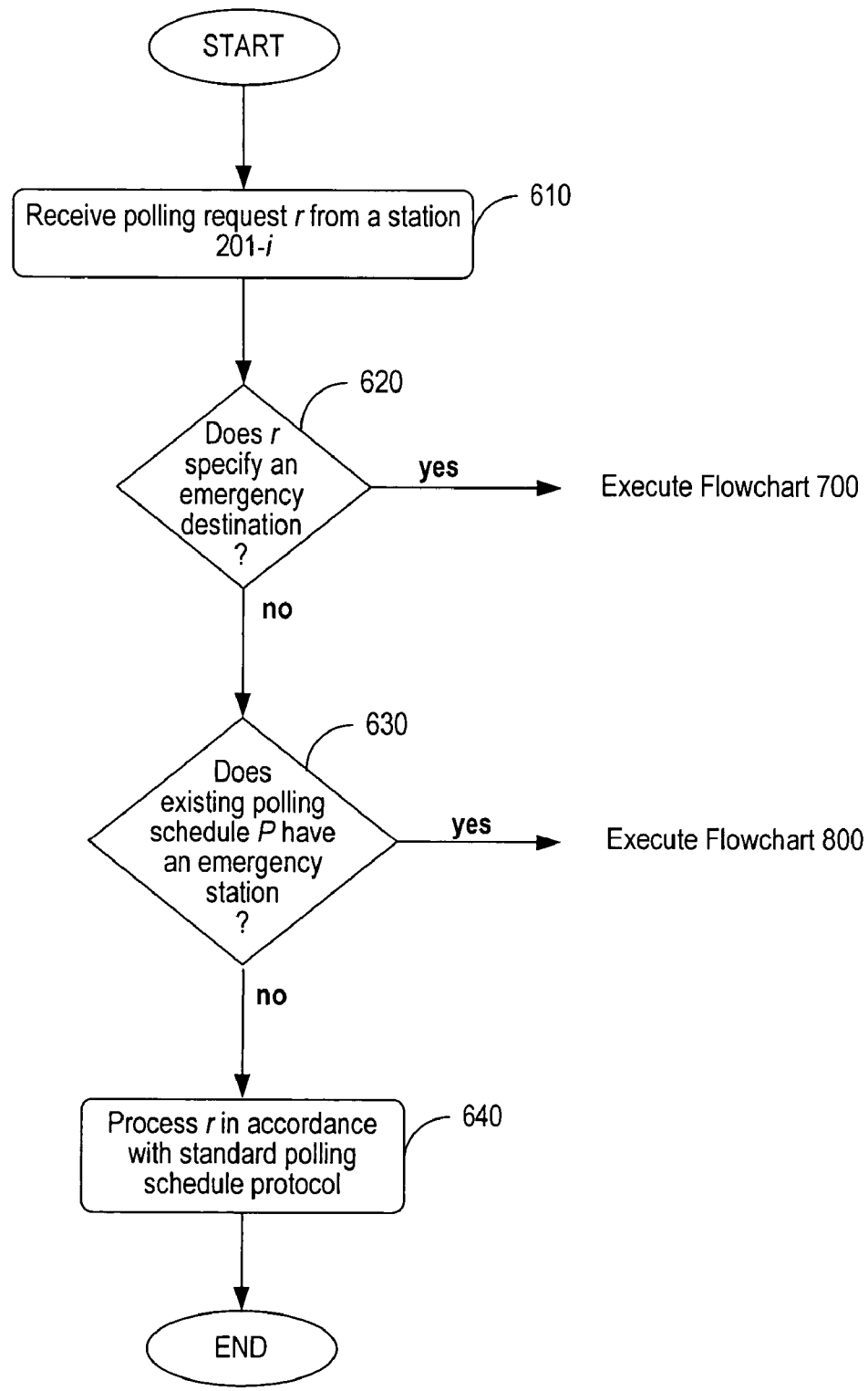
FIG. 6 depicts a flowchart for access point 202, as shown in FIG. 2, processing a polling request in accordance with the illustrative embodiment of the present invention.
Figure 7:
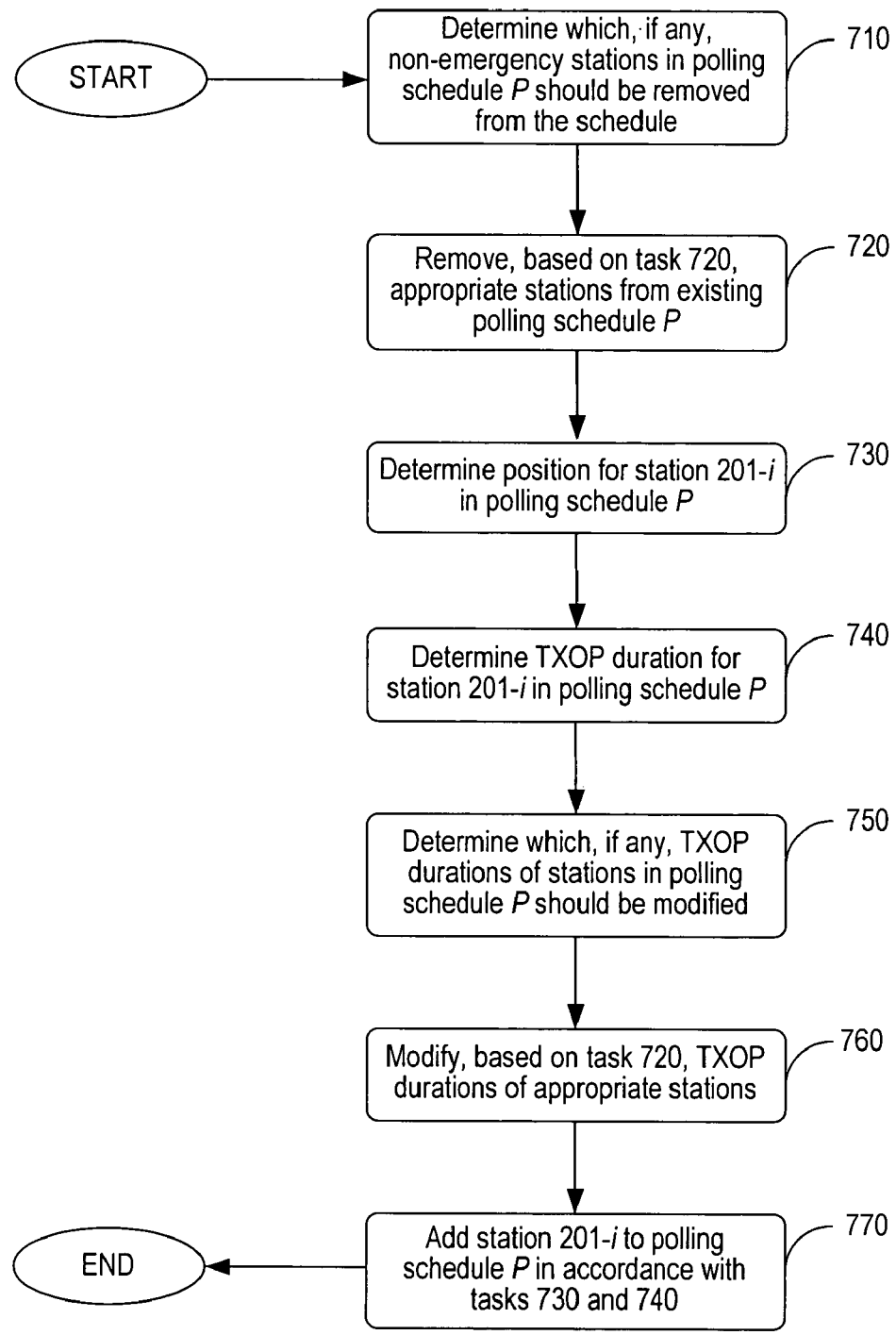
FIG. 7 depicts a flowchart for access point 202, as shown in FIG. 2, processing a polling request that specifies an emergency destination, in accordance with the illustrative embodiment of the present invention.
Figure 8:
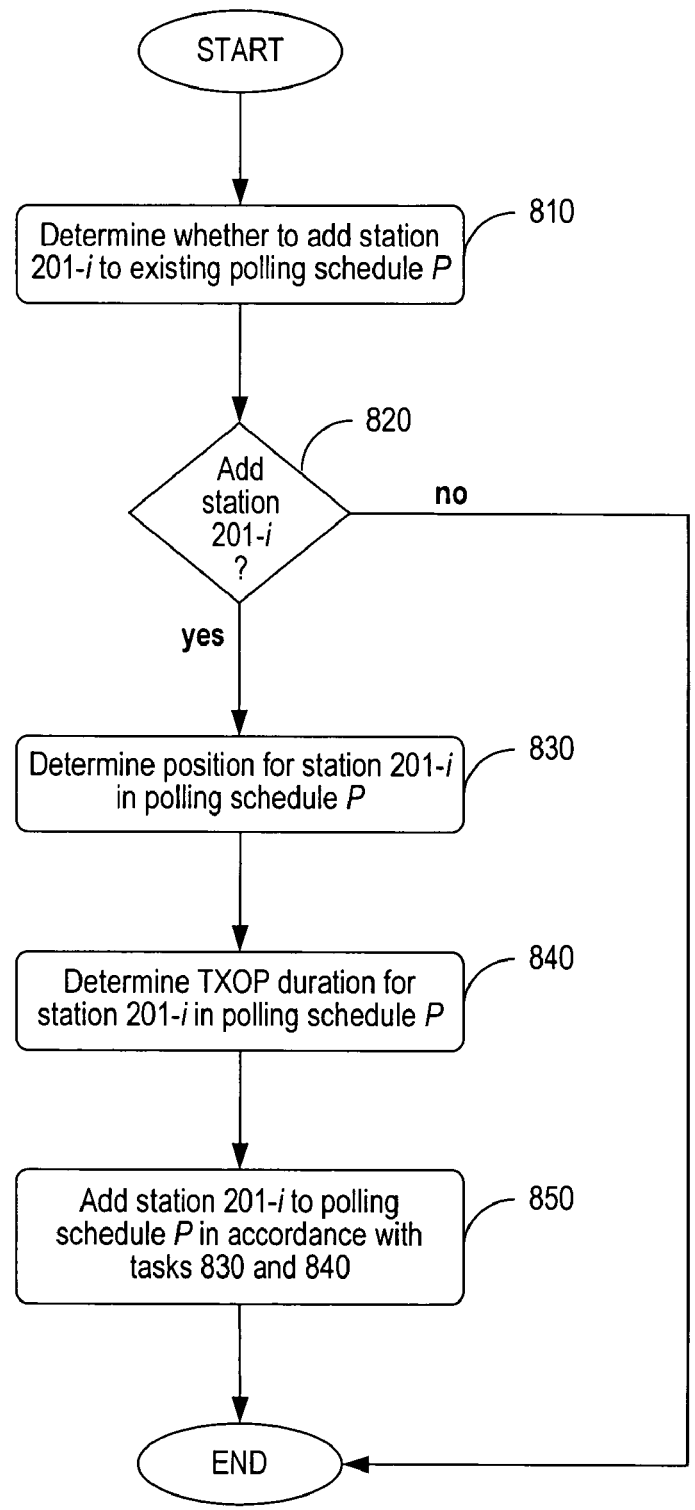
FIG. 8 depicts a flowchart for access point 202, as shown in FIG. 2, processing a polling request that does not specify an emergency destination, in accordance with the illustrative embodiment of the present invention.
Figure 9:
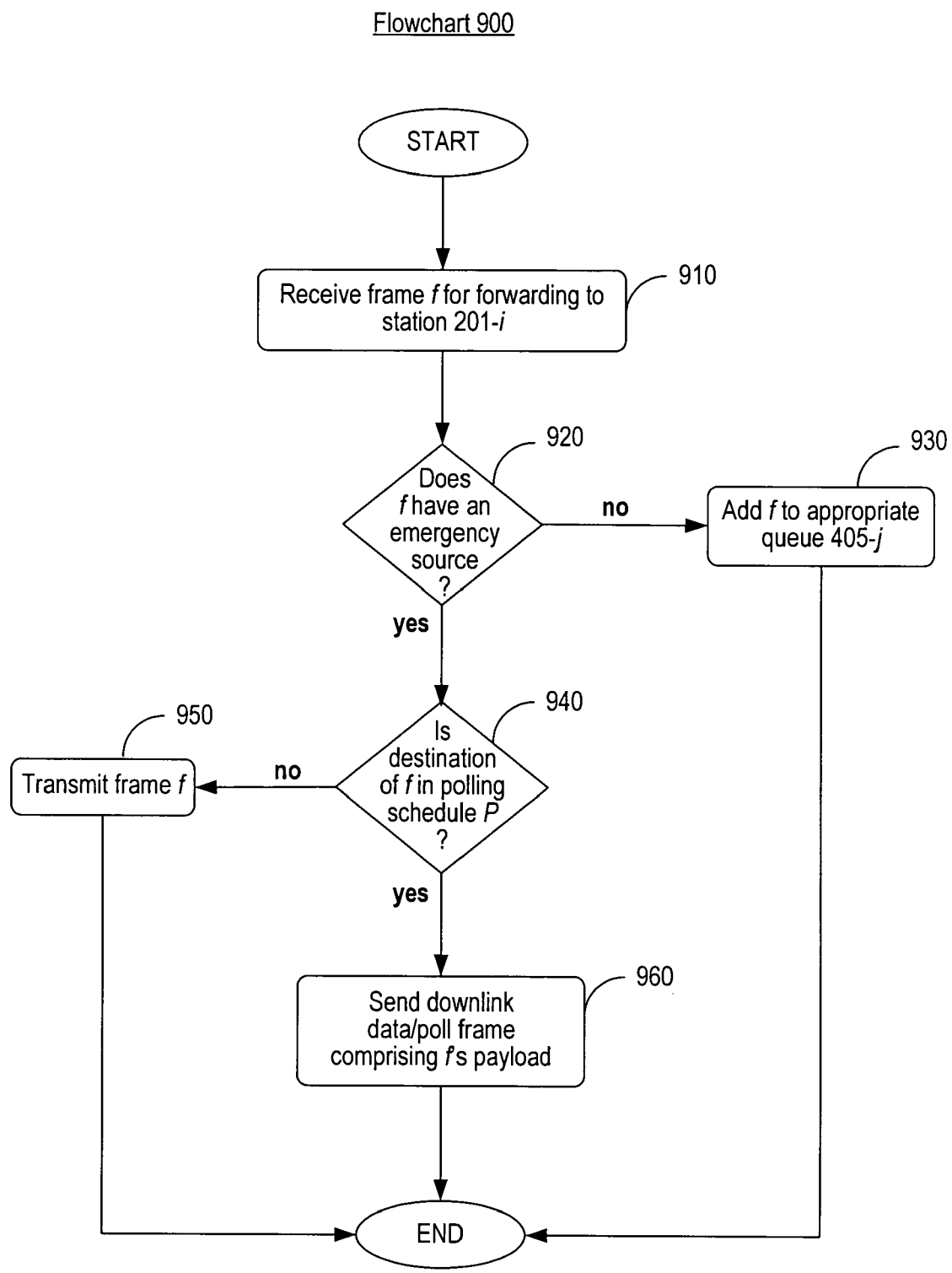
FIG. 9 depicts a flowchart for access point 202, as shown in FIG. 2, processing a frame for forwarding downstream to a station 201-$i$, as shown in FIG. 2, in accordance with the illustrative embodiment of the present invention.

Access point 202 is similar to access point 102 except that access point 202 (i) processes polling requests in accordance with FIG. 6 through FIG. 8, and (ii) processes frames received for forwarding to stations in accordance with FIG. 9.

As shown in FIG. 2, access point 202 and emergency call center 205 are connected to Public Switched Telephone Network (PSTN) 204 in well-known fashion (e.g., via a wireline link, wireless link, public branch exchange [PBX], intermediary server, etc.).

Figure 3:
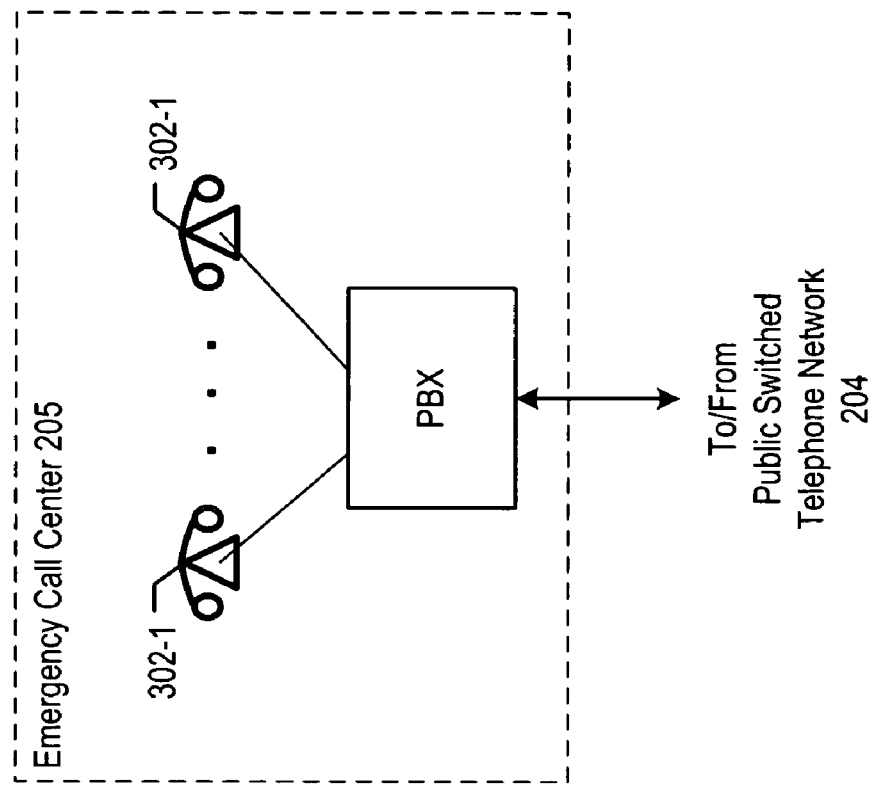
FIG. 3 depicts a block diagram of the salient components of emergency call center 205, as shown in FIG. 2.

FIG. 3 depicts a block diagram of the salient components of exemplary emergency call center 205. As shown in FIG. 3, emergency call center 205 comprises public branch exchange (PBX) 301, and operator telephones 302-1 through 302-N, interconnected as shown.

Private branch exchange 301 is capable of switching incoming calls from Public Switched Telephone Network 204 via one or more transmission lines to one of operator telephones 302-1 through 302-N. Private branch exchange 301 is also capable of handling outgoing calls from any of operator telephones 302-1 through 302-N to Public Switched Telephone Network 204 via one or more transmission lines that connect private branch exchange 301 to Public Switched Telephone Network 204.

Figure 4:
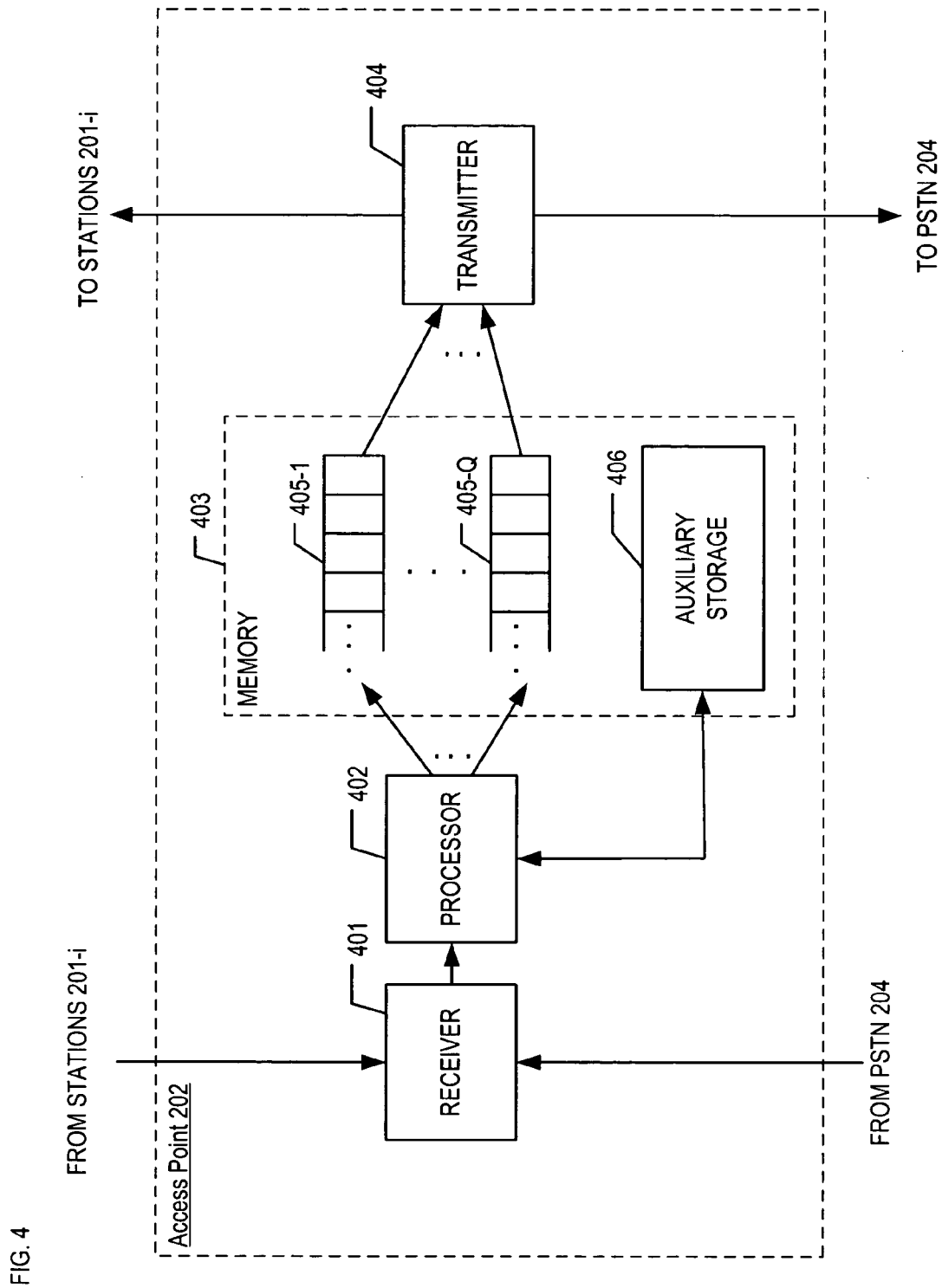
FIG. 4 depicts a block diagram of the salient components of access point 202, as shown in FIG. 2, in accordance with the illustrative embodiment of the present invention.

FIG. 4 depicts a block diagram of the salient components of access point 202 in accordance with the illustrative embodiment of the present invention. Access point 202 comprises: receiver 401, processor 402, memory 403, and transmitter 404, interconnected as shown.

As shown in FIG. 4, receiver 401 receives (i) frames from stations 201-$i$ and (ii) digital telephony signals from Public Switched Telephone Network (PSTN) 204, in well-known fashion, and forwards these data to processor 402. As will be appreciated by those skilled in the art, in some embodiments of the present invention receiver 401 might comprise a single radio for receiving both (i) and (ii), while in some other embodiments receiver 401 might comprise a radio for receiving (i) and separate means (e.g., Ethernet network interface card, etc.) for receiving (ii). It will also be appreciated by those skilled in the art that in some embodiments an intermediary (e.g., server, voice-over-IP [VoIP] processor, etc., not shown in FIG. 4) might receive digital telephony signals from PSTN 204, process the signals, and transmit the processed signals to receiver 401 in well-known fashion.

Processor 402 is a general-purpose processor that is capable of executing instructions stored in memory 403, of reading data from and writing data into memory 403, of generating frames, and of executing the tasks described below and with respect to FIG. 6 through FIG. 9, described below. In some alternative embodiments of the present invention, processor 402 might be a special-purpose processor (e.g., a network processor, etc.). In either case, it will be clear to those skilled in the art, after reading this disclosure, how to make and use processor 402.

Memory 403 stores data and executable instructions, as is well-known in the art, and might be any combination of random-access memory (RAM), flash memory, disk drive, etc. As shown in FIG. 4, memory 403 comprises queues 405-$i$ for i=1 to Q, wherein Q is a positive integer, and auxiliary storage 406.

Each queue 405-$i$ corresponds to a respective access category denoted "AC-i", where Q is the total number of access categories (e.g., 8, etc.), access category AC-1 has the highest priority, AC-2 has the second highest priority, etc. It will be clear to those skilled in the art how to make and use embodiments of the present invention in which some other priority ordering is employed.

As is well-understood in the art, processor 402 generates frames and transmits both:

(i) generated frames, and (ii) frames received from receiver 401 to transmitter 404 via queues 405-1 through 405-Q based on access category, thereby providing prioritized quality-of-service (QoS).

Auxiliary storage 406 stores other data and executable instructions for processor 402 with respect to FIG. 6 through FIG. 9, as described below.

Transmitter 404 transmits frames from queues 405-1 through 405-Q in prioritized order to stations 201-$i$ and Public Switched Telephone Network (PSTN) 204, as appropriate, in well-known fashion. As will be appreciated by those skilled in the art, in some embodiments transmitter 404 might comprise a single radio for transmitting to both stations 201-$i$ and PSTN 204, while in some other embodiments transmitter 404 might comprise a radio for transmitting frames to stations 201-$i$, and separate means (e.g., Ethernet network interface card, etc.) for transmitting telephony-based frames (e.g., signaling frames, voice frames, etc.) to PSTN 204. It will also be appreciated by those skilled in the art that in some embodiments an intermediary (e.g., server, voice-over-IP [VoIP] processor, etc., not shown in FIG. 4) might receive telephony-based frames from transmitter 404 process the frames, and transmit corresponding digital signals (e.g., IP packets, etc.) to PSTN 204, in well-known fashion.

Figure 5:
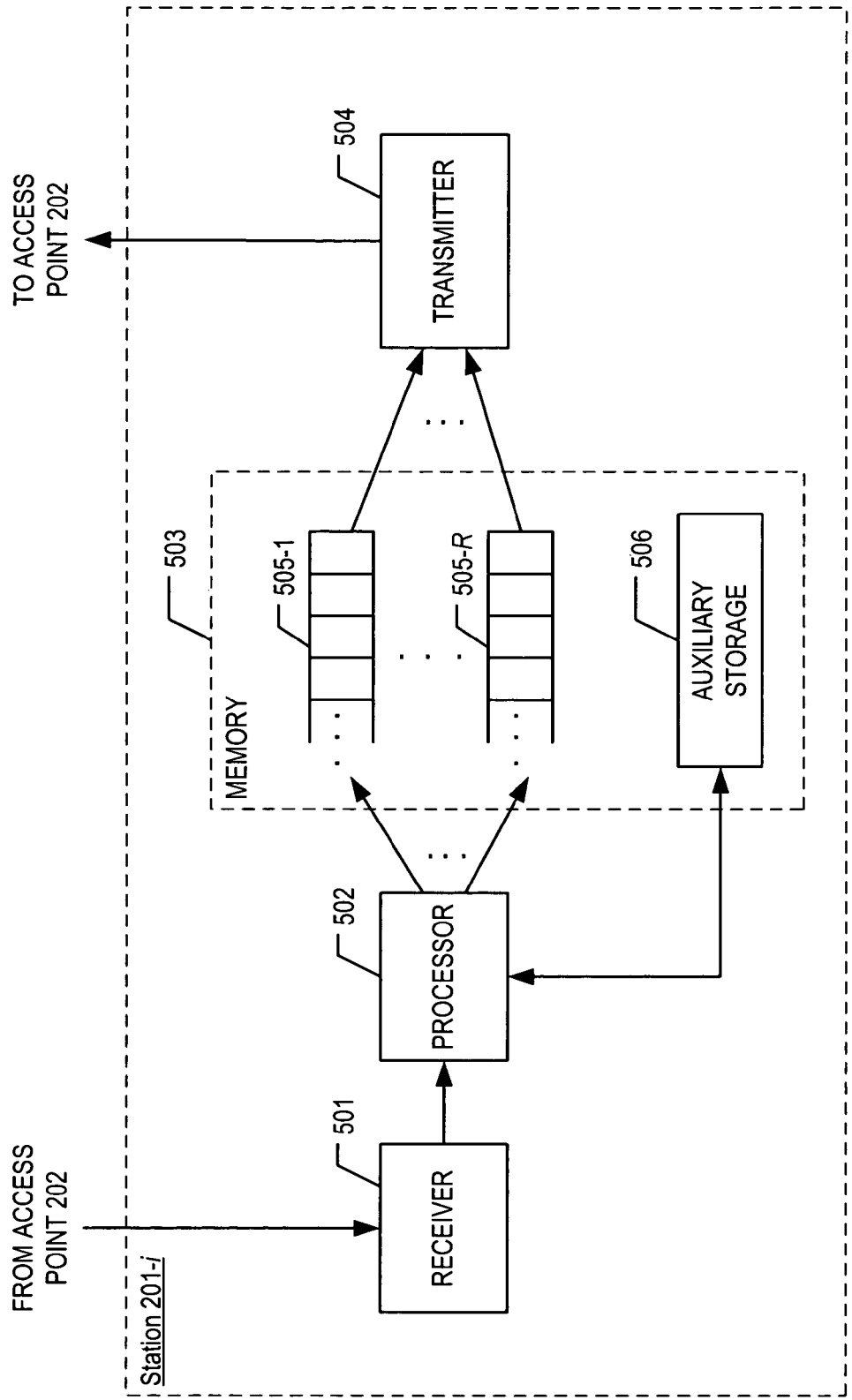
FIG. 5 depicts a block diagram of the salient components of station 201-$i$, as shown in FIG. 2, in accordance with the illustrative embodiment of the present invention.

FIG. 5 depicts a block diagram of the salient components of station 201-$i$, in accordance with the illustrative embodiment of the present invention. Station 201-$i$ comprises: receiver 501, processor 502, memory 503, and transmitter 504, interconnected as shown.

As shown in FIG. 5, receiver 501 receives frames wirelessly from access point 202 in well-known fashion, and forwards the frames to processor 502. It will be clear to those skilled in the art how to make and use embodiments of receiver 501.

Processor 502 is a general-purpose processor that is capable of executing instructions stored in memory 503, generating frames, and reading data from and writing data into memory 503. In some alternative embodiments of the present invention, processor 502 might be a special-purpose processor. In either case, it will be clear to those skilled in the art, after reading this disclosure, how to make and use processor 502.

Memory 503 stores data and executable instructions, as is well-known in the art, and might be any combination of random-access memory (RAM), flash memory, disk drive, etc. As shown in FIG. 5, memory 503 comprises queues 505-$i$ for i=1 to R, wherein R is a positive integer, and auxiliary storage 506.

Each queue 505-$i$ corresponds to respective access category AC-$i$, as described above, where R is the total number of access categories (e.g., 8, etc.). As is well-understood in the art, processor 502 generates frames and forwards the frames to transmitter 404 via queues 505-1 through 505-R based on access category, thereby providing prioritized quality-of-service (QoS).

Auxiliary storage 506 stores other data and executable instructions for processor 502 with respect to FIG. 10, described below.

Transmitter 504 removes frames in prioritized order from queues 505-1 through 505-R, as described below in FIG. 10, and transmits the frames to access point 202 in well-known fashion. It will be clear to those skilled in the art how to make and use embodiments of transmitter 504.

FIG. 6 depicts flowchart 600 for access point 202's processing a polling request in accordance with the illustrative embodiment of the present invention. It will be clear to those skilled in the art which tasks depicted in FIG. 6 can be performed simultaneously or in a different order than that depicted.

At task 610, access point 202 receives a polling request r from a station 201-$i$.

At task 620, access point 202 determines whether polling request r specifies a destination associated with an emergency call center. As will be appreciated by those skilled in the art, this determination can be performed by consulting a local look-up table of emergency identifiers (e.g., telephone numbers, IP addresses, etc.), by submitting a query to a remote database, etc. Alternatively, in some embodiments polling request r might explicitly contain a flag that indicates whether the destination is associated with an emergency call center. If polling request r does specify an emergency destination, execution proceeds to flowchart 700, depicted in FIG. 7 and described below. Otherwise, execution continues at task 630, described below.

At task 630, access point 202 consults its existing polling schedule P and checks whether schedule P already includes a poll to a station that transmits frames to an emergency destination (i.e., a poll to an "emergency station"). If schedule P includes such a poll, execution proceeds to flowchart 800, depicted in FIG. 8 and described below. Otherwise, execution continues at task 640, described below.

At task 640, access point 202 processes polling request r in accordance with its standard polling schedule protocol (e.g., IEEE 802.11 Point Coordination Function [PCF], IEEE 802.11e Hybrid Coordination Function [HCF], etc.)

FIG. 7 depicts flowchart 700 for access point 202's processing a polling request that specifies an emergency destination, in accordance with the illustrative embodiment of the present invention. It will be clear to those skilled in the art which tasks depicted in FIG. 7 can be performed simultaneously or in a different order than that depicted.

At task 710, access point 202 identifies the non-emergency stations in its existing polling schedule P (i.e., the stations in polling schedule P that do not transmit frames to an emergency destination) and determines which of these stations, if any, to remove from polling schedule P. In some embodiments, all non-emergency stations might be deleted, while in some other embodiments, non-emergency stations with access categories above a particular level (i.e., priorities below a particular level) might be deleted, while in still some other embodiments, no stations are deleted from polling schedule P. As will be appreciated by those skilled in the art, there are a variety of design choices for task 710, and it will be clear how to define and implement desired behavior for a particular embodiment.

At task 720, access point 202 removes the appropriate non-emergency stations from polling schedule P in accordance with task 710.

At task 730, access point 202 determines the appropriate position at which to add a poll to station 201-$i$ to polling schedule P. As will be appreciated by those skilled in the art, in some embodiments the poll to 201-$i$ might be inserted before any polls to non-emergency stations (just as, for example, a baseball manager puts a good hitter at the top of the lineup to potentially increase his number of at-bats), while in some other embodiments, the poll to 201-$i$ might be simply appended at the end of polling schedule P. It will be clear to those skilled in the art how to define and implement any of a variety of desired behaviors for task 730.

At task 740, access point 202 determines the duration of station 201-$i$'s transmission opportunity (TXOP) in polling schedule P. As will be appreciated by those skilled in the art, in some embodiments this duration might be longer than the TXOP durations of non-emergency stations in polling schedule P, while in some other embodiments, the duration of station 201-$i$'s TXOP might be the same as that of one or more non-emergency stations (e.g., non-emergency stations that transmit frames belonging to access category AC-1, etc.). It will be clear to those skilled in the art how to define and implement task 740 in accordance with desired behavior for a particular embodiment.

At task 750, access point 202 determines whether the TXOP durations of any stations already in polling schedule P should be modified as a result of adding station 201-*i* to P, as described below in task 770. As will be appreciated by those skilled in the art, in some embodiments the TXOP durations of all non-emergency stations already in polling schedule P might be shortened, while in some other embodiments, TXOP durations might be modified for particular stations (e.g., non-emergency stations that transmit frames belonging to an access category above, say, AC-4, etc.) It will be clear to those skilled in the art how to define and implement task 750 in accordance with desired behavior for a particular embodiment.

At task 760, access point 202 modifies the appropriate TXOP durations in polling schedule P in accordance with task 740. As will be appreciated by those skilled in the art, in some embodiments the degree to which TXOP durations are shortened might be based on some property of the stations, or of the frames that they transmit (e.g., access category, etc.), while in some other embodiments, TXOP durations might be shortened uniformly for all non-emergency stations. It will be clear to those skilled in the art how to define and implement task 760 in accordance with desired behavior for a particular embodiment.

At task 770, access point 202 adds station 201-*i* to polling schedule P in accordance with tasks 730 and 740.

FIG. 8 depicts flowchart 800 for access point 202's processing a polling request that does not specify an emergency destination, in accordance with the illustrative embodiment of the present invention. It will be clear to those skilled in the art which tasks depicted in FIG. 8 can be performed simultaneously or in a different order than that depicted.

At task 810, access point 202 determines whether to add station 201-*i* to existing polling schedule P. As will be appreciated by those skilled in the art, in some embodiments a new non-emergency station might never be added to a polling schedule that already includes an emergency station, while in some other embodiments this determination might be based on some property of the non-emergency station, or of the frames that the station will transmit (e.g., access category, etc.). It will be clear to those skilled in the art how to define and implement task 810 in accordance with desired behavior for a particular embodiment.

At task 820, a branch is performed: if access point 202 determined in task 810 that station 201-*i* is to be added to existing polling schedule P, execution continues at task 830, described below; otherwise, flowchart 800 terminates.

At task 830, access point 202 determines the appropriate position at which to add a poll to station 201-*i* to polling schedule P. As will be appreciated by those skilled in the art, in some embodiments the poll to 201-*i* might be simply appended at the end of polling schedule P, while in some other embodiments, the poll to 201-*i* might be inserted into the non-emergency portion of polling schedule P based on some property of station 201-*i*, or of the frames that station 201-*i* will transmit (e.g., access category, etc.). It will be clear to those skilled in the art how to define and implement task 830 in accordance with desired behavior for a particular embodiment.

At task 840, access point 202 determines the duration of station 201-*i*'s transmission opportunity (TXOP) in polling schedule P. As will be appreciated by those skilled in the art, in some embodiments this duration might be shorter than the TXOP durations of emergency stations in polling schedule P, while in some other embodiments, the duration of station 201-*i*'s TXOP might be based on some property of station 201-*i*, or of the frames that station 201-*i* will transmit (e.g., access category, etc.). It will be clear to those skilled in the art how to define and implement task 840 in accordance with desired behavior for a particular embodiment.

At task 850, access point 202 adds station 201-*i* to polling schedule P in accordance with tasks 830 and 840.

FIG. 9 depicts flowchart 900 for access point 202's processing a frame for forwarding downstream to a station 201-*i* in accordance with the illustrative embodiment of the present invention.

At task 910, access point 202 receives frame f for forwarding to station 201-*i* in well-known fashion.

At task 920, access point 202 determines whether the source of frame f is associated with an emergency call center. As will be appreciated by those skilled in the art, this determination can be performed by consulting a local look-up table of emergency identifiers (e.g., telephone numbers, IP addresses, etc.), by submitting a query to a remote database, etc. If the source of frame f is associated with an emergency call center, execution proceeds to task 940, described below, otherwise, execution continues at task 930, described below.

At task 930, access point 202 adds frame f to the appropriate queue 405-*j* based on f's access category. After completion of task 930, flowchart 900 terminates.

At task 940, access point 202 checks whether the destination station of frame f is polled in polling schedule P. If so, execution proceeds to task 960, described below, otherwise, execution continues at task 950, described below At task 950, access point 202 transmits frame f to the appropriate destination station in well-known fashion. After completion of task 950, flowchart 900 terminates.

At task 960, access point 202 composes a downstream data/poll frame comprising a poll and the payload of frame f, and transmits the downstream data/poll frame to the destination station. After completion of task 960, flowchart 900 terminates.

Figure 10:
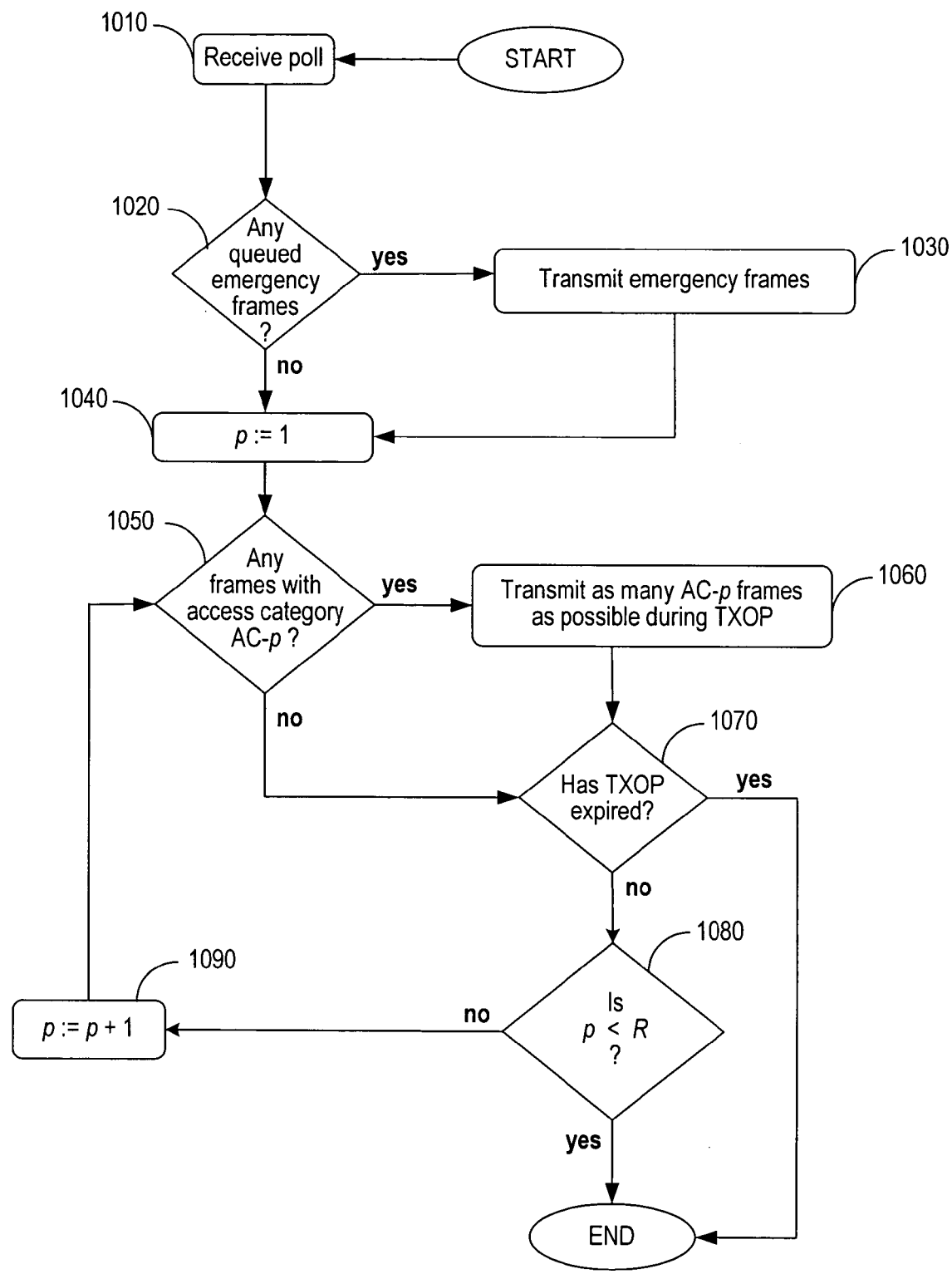
FIG. 10 depicts a flowchart for station 201-$i$, as shown in FIG. 2, transmitting frames during a transmission opportunity (TXOP), in accordance with the illustrative embodiment of the present invention.

FIG. 10 depicts flowchart 1000 for station 201-*i*'s transmitting frames during a transmission opportunity (TXOP), in accordance with the illustrative embodiment of the present invention. It will be clear to those skilled in the art which tasks depicted in FIG. 10 can be performed simultaneously or in a different order than that depicted.

At task 1010, station 201-*i* receives a poll from access point 202 in well-known fashion.

At task 1020, station 201-*i* determines whether there are any frames in queues 505-1 through 505-R that have an emergency call center as a destination. If there are any such frames, execution proceeds to task 1030; otherwise, execution continues at task 1020.

As will be appreciated by those skilled in the art, the determination of task 1020 can be performed in a variety of ways. In some embodiments, station 201-*i*'s processor 502 might check the destination of each frame in queues 505-1 through 505-R for a match against a local table or remote database of emergency call center identifiers. In some other embodiments, processor 502 might check only queue 505-1, since, presumably, an emergency transmission would be of the highest priority (i.e., belong to access category AC-1). In still some other embodiments, an extra queue (called, say, 505-0) might be provided to buffer emergency frames separately.

At task 1030, station 201-*i* transmits the emergency frames identified at task 1020 to access point 202 in well-known fashion. After completion of task 1030, execution continues at task 1040.

At task 1040, access category index variable p is initialized to 1.

At task 1050, station 201-*i* checks if queue 505-*p* has any frames. If there are one or more frames, execution proceeds to task 1060; otherwise execution continues at task 1070.

At task 1060, station 201-*i* transmits as many frames of queue 505-*p* as possible during its allotted transmission opportunity (TXOP).

At task 1070, station 201-*i* checks whether the transmission opportunity (TXOP) has expired. If so, flowchart 1000 terminates, otherwise execution continues at task 1080.

At task 1080, station 201-*i* determines whether p<R. (As defined above, R equals the number of queues 505 in station 201-*i* and corresponds to the lowest-priority access category.) If p<R, execution proceeds to task 1090, otherwise flowchart 1000 terminates.

At task 1090, index p is incremented. After task 890, execution continues back at task 1050.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

The invention claimed is:

1. A method comprising:
   (a) receiving a polling request via a shared communications channel, wherein said polling request specifies a destination for a subsequent transmission via said shared communications channel; and
   (b) determining whether to add the sender of said polling request to a polling schedule based on whether said destination is associated with an emergency call center; and
   (c) determining whether to delete the sender of a prior polling request from said polling schedule based on the destination specified by said prior polling request, and
   (d) deleting the sender of said prior polling request from said polling schedule; and further
   (e) adding the sender of said polling request to said polling schedule; when: the destination specified by said polling request is associated with an emergency call center, and the destination specified by said prior polling request is unassociated with any emergency call center.

2. The method of claim 1 wherein (b) is also based on a destination specified by a prior polling request, wherein the sender of said prior polling request is in said polling schedule.

3. The method of claim 1 further comprising determining a transmission opportunity duration in a polling schedule for the sender of said polling request based on whether said destination is associated with an emergency call center.

4. A method comprising:
   (a) receiving a polling request via a shared communications channel, wherein said polling request specifies a destination for a subsequent transmission via said shared communications channel; and
   (b) determining a position in a polling schedule for the sender of said polling request based on whether said destination is associated with emergency call center,
   (c) determining whether to delete the sender of a prior polling request from said polling schedule based on the destination specified by said prior polling request, and
   (d) deleting the sender of said prior polling request from said polling schedule; and further
   (e) adding the sender of said polling request to said polling schedule; when: the destination specified by said polling request is associated with an emergency call center, and the destination specified by said prior polling request is unassociated with any emergency call center.

5. The method of claim 4 wherein (b) is also based on a destination specified by a prior polling request, wherein the sender of said prior polling request is in said polling schedule.

6. The method of claim 4 further comprising determining a transmission opportunity duration in a polling schedule for the sender of said polling request based on whether said destination is associated with an emergency call center.

7. A method comprising:
   (a) receiving a polling request via a shared communications channel, wherein said polling request specifies a destination for a subsequent transmission via said shared communications channel; and
   (b) determining a transmission opportunity duration in a polling schedule for the sender of said polling request based on whether said destination is associated with emergency call center,
   (c) determining whether to delete the sender of a prior polling request from said polling schedule based on the destination specified by said prior polling request, and
   (d) deleting the sender of said prior polling request from said polling schedule; and further
   (e) adding the sender of said polling request to said polling schedule; when: the destination specified by said polling request is associated with an emergency call center, and the destination specified by said prior polling request is unassociated with any emergency call center.

8. The method of claim 7 wherein (b) is also based on a destination specified by a prior polling request, wherein the sender of said prior polling request is in said polling schedule.

9. The method of claim 7 further comprising:
   (c) determining a position in said polling schedule for the sender of said polling request based on said destination.

10. A method comprising: receiving via a shared-communications channel
   (i) a first frame comprising a first source, a first destination, and a first payload, and
   (ii) a second frame comprising a second source, a second destination, and a second payload; and transmitting via said shared-communications channel
   (iii) a third frame comprising a poll and said first payload, and
   (iv) a fourth frame comprising a poii and said second payload in an order based on whether said first source and said second source is associated with emergency call center when said first destination and said second destination are in a polling schedule,
   (c) determining whether to delete the sender of a prior polling request from said polling schedule based on the destination specified by said prior polling request, and
   (d) deleting the sender of said prior polling request from said polling schedule; and further
   (e) adding the sender of said polling request to said polling schedule; when: the destination specified by said polling request is associated with an emergency call center, and the destination specified by said prior polling request is unassociated with any emergency call center.

11. The method of claim 10 wherein said order is also based on the positions of said first destination and said second destination in said polling schedule.

12. The method of claim 10 further comprising determining a transmission opportunity duration in a polling schedule for the sender of said polling request based on whether said destination is associated with an emergency call center.

13. An apparatus comprising: a receiver for receiving a polling request via a shared communications channel, wherein said polling request specifies a destination for a subsequent transmission via said shared communications channel; and a processor for determining, based on whether said destination source is associated with emergency call center, at least one of:
  whether to add the sender of said polling request to a polling schedule, a position in said polling schedule for the sender of said polling request, and a transmission opportunity duration for the sender of said polling request,
  (c) determining whether to delete the sender of a prior polling request from said polling schedule based on the destination specified by said prior polling request, and
  (d) deleting the sender of said prior polling request from said polling schedule; and further
  (e) adding the sender of said polling request to said polling schedule; when: the destination specified by said polling request is associated with an emergency call center, and the destination specified by said prior polling request is unassociated with any emergency call center.

14. The apparatus of claim 13 wherein said processor's determining is also based on a destination specified by a prior polling request, wherein the sender of said prior polling request is in said polling schedule.

15. An apparatus comprising: a memory for storing a polling schedule; a receiver for receiving via a shared-communications channel
  (i) a first frame comprising a first source, a first destination, and a first payload, and
  (ii) a second frame comprising a second source, a second destination, and a second payload; and a processor for:
  generating a third frame comprising a poll and said first payload,
  generating a fourth frame comprising a poll and said second payload, and
  determining, based on whether at least one of said first source and said second source is associated with emergency call center, an order in which to transmit said third frame and said fourth frame when said first destination and said second destination are in said polling schedule,
  (c) determining whether to delete the sender of a prior polling request from said polling schedule based on the destination specified by said prior polling request, and
  (d) deleting the sender of said prior polling request from said polling schedule; and further
  (e) adding the sender of said polling request to said polling schedule; when: the destination specified by said polling request is associated with an emergency call center, and the destination specified by said prior polling request is unassociated with any emergency call center.

* * * * *

UNITED STATES PATENT AND TRADEMARK OFFICE
CERTIFICATE OF CORRECTION

PATENT NO.       : 7,047,002 B2  
APPLICATION NO.  : 10/688473  
DATED            : May 16, 2006  
INVENTOR(S)      : David Michael Lezoff It is certified that error appears in the above-identified patent and that said Letters Patent is hereby corrected as shown below:

Claim 10, Column 10, Line 56, "(iv) a fourth frame comprising a poii and siad second" should read -- a fourth frame comprising a poll and said second --.

Signed and Sealed this

Twelfth Day of September, 2006

JON W. DUDAS  
*Director of the United States Patent and Trademark Office*